United States Patent
Schneeweiss et al.

(10) Patent No.: US 11,556,045 B2
(45) Date of Patent: Jan. 17, 2023

(54) DEVICE FOR GENERATING INDIVIDUAL PHOTONS

(71) Applicants: Humboldt-Universitaet zu Berlin, Berlin (DE); University of Copenhagen, Copenhagen K (DK)

(72) Inventors: Philipp Schneeweiss, Berlin (DE); Juergen Volz, Berlin (DE); Arno Rauschenbeutel, Berlin (DE); Sahand Mahmoodian, Hannover (DE); Anders Søndberg Sørensen, Copenhagen (DK)

(73) Assignees: Humboldt-Universitaet zu Berlin, Berlin (DE); University of Copenhagen, Copenhagen K (DK)

( * ) Notice: Subject to any disclaimer, the term of this patent is extended or adjusted under 35 U.S.C. 154(b) by 0 days.

(21) Appl. No.: 17/642,009

(22) PCT Filed: Sep. 20, 2019

(86) PCT No.: PCT/EP2019/075386
§ 371 (c)(1),
(2) Date: Mar. 10, 2022

(87) PCT Pub. No.: WO2021/052606
PCT Pub. Date: Mar. 25, 2021

(65) Prior Publication Data
US 2022/0350220 A1 Nov. 3, 2022

(51) Int. Cl.
*G02F 1/365* (2006.01)
*G02F 1/355* (2006.01)

(52) U.S. Cl.
CPC ............ *G02F 1/365* (2013.01); *G02F 1/3551* (2013.01); *G02F 1/3556* (2013.01); *G02F 2202/105* (2013.01)

(58) Field of Classification Search
CPC ...... G02F 1/3551; G02F 1/3556; G02F 1/365; G02F 2202/105
See application file for complete search history.

(56) References Cited

U.S. PATENT DOCUMENTS

| | | | |
|---|---|---|---|
| 7,406,221 B2 * | 7/2008 | Noda | B82Y 20/00 385/14 |
| 11,049,037 B2 * | 6/2021 | Gea-Banacloche | G02B 6/1225 |

(Continued)

FOREIGN PATENT DOCUMENTS

| | | |
|---|---|---|
| CN | 106662707 A | 5/2017 |
| CN | 107592915 A | 1/2018 |

(Continued)

OTHER PUBLICATIONS

International Search Report in PCT/EP2019/075386, dated Jul. 3, 2020.

(Continued)

*Primary Examiner* — Daniel Petkovsek
(74) *Attorney, Agent, or Firm* — Collard & Roe, P.C.

(57) ABSTRACT

A device for generating individual photons with energy E includes quantum emitters, having at least one determined transition with the energy E from an energy level N* to a lower energy level N1. The emitters are near a propagation path running from first to second regions. The device also includes at least one light source to output light, for propagation along the path. The light has the energy E for resonant excitation of the energy level N*. The emitters are arranged so that optionally exactly Z emitters are illuminated, forming an optical thickness $\tau > 0$ for the light along the path. The number Z lies in a range of $Z0 \pm 10\%$ and Z0 is a number at which a maximum destructive interference in the second region occurs between a two-photon component of the light (Continued)

scattered on the ZO emitters and a two-photon component of the non-scattered light.

20 Claims, 2 Drawing Sheets

(56) References Cited

U.S. PATENT DOCUMENTS

| | | | | |
|---|---|---|---|---|
| 2005/0025200 A1* | 2/2005 | Santori | ............... | H04B 10/70 372/25 |
| 2008/0089367 A1* | 4/2008 | Srinivasan | ........... | G02B 6/4202 372/19 |
| 2010/0289408 A1* | 11/2010 | Madey | ................ | H04B 10/70 250/493.1 |
| 2018/0107937 A1 | 4/2018 | Bennett et al. | | |
| 2019/0115714 A1* | 4/2019 | Shen | ................ | H01S 3/0635 |
| 2019/0212766 A1* | 7/2019 | Monroe | ............... | B82Y 10/00 |

FOREIGN PATENT DOCUMENTS

| | | | | |
|---|---|---|---|---|
| CN | 109844969 A | | 6/2019 | |
| GB | 2599048 A | * | 3/2022 | ............... G02F 1/35 |
| WO | WO-2015193240 A1 | * | 12/2015 | ............ B82Y 20/00 |
| WO | 2016/169931 A | | 10/2016 | |
| WO | 2018/015738 A1 | | 1/2018 | |

OTHER PUBLICATIONS

F. Ripka et al., "A room-temperature single-photon source based on strongly interacting Rydberg atoms", Science 362, 446 (2018), 4 pages.

Eisaman, M.D. et al. "Invited Review Article: Single-photon sources and detectors" Review of Scientific Instruments, AIP, Melville, NY, US, vol. 82, No. 7, Jul. 27, 2011 (Jul. 27, 2011), pp. 71101-1 to 71101-25.

S. Mahmoodian et al., "Strongly Correlated Photon Transport in Waveguide Quantum Electrodynamics with Weakly Coupled Emitters" Physical Review Letters 121, 143601 (2018).

R. Mitsch et al., "Exploiting the local polarization of strongly confined light for sub-micrometer-resolution internal state preparation and manipulation of cold atoms", Physical Review A 89, 063829 (2014), pp. 063829-1 to 063829-6.

J.C. López Carreño et al. "Joint subnatural-linewidth and single-photon emission from resonance fluorescence" arxiy.org, Cornell University Library, 201 Olin Library Cornell University Ithaca, NY 14853, Feb. 13, 2018 (Feb. 13, 2018), pp. 1-22.

Kornovan, D.F. etal. "Light interaction and quantum transport in atomic chain chirally coupled to a waveguide" 2017 11th International Congress on Engineered Materials Platforms for Novel Wave Phenomena (Metamaterials), IEEE, Aug. 27, 2017 (Aug. 27, 2017), pp. 262-264.

Christian Kurtsiefer et al. "Stable Solid-State Source of Single Photons" Physical Review Letters, vol. 85, No. 2, Jul. 10, 2000 (Jul. 10, 2000), pp. 290-293.

Axel Kuhn et al. "Deterministic Single-Photon Source for Distributed Quantum Networking" Physical Review Letters, US, vol. 89, No. 6, Jul. 19, 2002 (Jul. 19, 2002), pp. 067901-1 to 067901-4.

Chen, Zihao et al. "Deterministic Two-photon Controlled Phase Gate by Exploiting Nonlinear Pi-Phase Shift in Photonic Molecule Generations" SPIE—International Society for Optical Engineering. Proceedings, SP IE—International Society for Optical Engineering, US, vol. 10933, Mar. 4, 2019 (Mar. 4, 2019), pp. 109330C-1 to 109330C-9.

Chinese Office Action in Chinese Application No. 201980099728.5 dated Sep. 23, 2022.

* cited by examiner

DEVICE FOR GENERATING INDIVIDUAL PHOTONS

CROSS REFERENCE TO RELATED APPLICATIONS

This application is the National Stage of PCT/EP2019/075386 filed on Sep. 20, 2019, the disclosure of which is incorporated by reference. The international application under PCT article 21(2) was not published in English.

FIELD OF THE INVENTION

The present invention relates to a device for generating single photons with an energy E, comprising a plurality of quantum emitters which have at least one determined transition with the energy E from an energy level N* to a lower energy level N1.

PRIOR ART

Single-photon sources, i.e. light sources that emit only single photons and never two photons at the same time, play a central role in many applications in quantum technology, particularly in quantum key distribution. They are used, for example, as a light source for quantum cryptography in many commercial devices, since in such applications two simultaneously present photons constitute a security risk. In this case, for example, an eavesdropper could branch off one of the two photons unnoticed and thus obtain information about the distributed keys.

In research, to generate single photons, use is sometimes made of very complex methods which are based, for example, on interacting Rydberg atoms (cf. for example F. Ripka et al., Science 362, 446 (2018)) and due to their complexity play practically no role in the application.

An overview of a variety of possibilities for generating single photons can be found, for example, in M. D. Eisaman et al., Review of Scientific Instruments 82, 071101 (2011).

These days, three methods are most commonly used to implement single-photon sources in practical applications:

1. Strongly attenuated laser pulses: In this case, single laser pulses are so strongly attenuated that the probability p of having one photon in a single laser pulse is very low (typically around p=10%). The probability of obtaining two photons per pulse is given by $p^2$ (=1% for p=10%) and is therefore significantly lower than the single-photon probability. Although such sources are easy to implement, they do not constitute genuine single-photon sources, since there is always a probability of two photons occurring at the same time. This can only be reduced at the expense of the single-photon probability. In quantum cryptography protocols, this leads to fundamental limitations in the data transfer rates and the security of the protocol.

2. Single quantum emitters: Alternatively, use is made of single-photon sources that use the emission properties of single quantum emitters, such as, for example, single atoms or molecules. To this end, these are typically excited by illumination using an external light field. Upon reverting to the basic state, exactly one photon is emitted in this case, never two. By collecting these photons, which are typically emitted in all directions, a single-photon source is obtained. Although it is possible to be certain that two photons never occur at the same time with such sources, these sources nevertheless also have serious disadvantages:

Low photon yield; typically, most photons are not emitted into the collection optics, i.e. not in a clearly defined mode, and therefore usually only a few percent of the emitted photons are collected, resulting in low single-photon rates.

Sometimes complex construction; particularly when resonators are used to increase the collection efficiency, it must be ensured that the frequency of the resonator mode matches the frequency of the emitted light.

Many emitters used in single-photon sources exhibit an inhomogeneous broadening of the emission wavelength, particularly when the emitters are built into solids. In this case, the emitted photons are no longer suitable for all protocols. As a result, the source in question is no longer suitable for versatile use.

3. Parametric down-conversion: In the case of such sources, a non-linear crystal is pumped by a laser beam. In a spontaneous process, a photon from the pump laser is randomly converted at certain times into two photons of lower frequency. If this photon pair is split into two beams and the application is triggered when a photon is present in one of the two beams, then it is also known that a photon is present in the second beam. A single-photon source is thus obtained. Although additional information as to when exactly a single photon is present in the other beam is obtained on account of the trigger mechanism, these sources nevertheless also have serious disadvantages:

typically a large spectral bandwidth and photon pair rates that are low relative to the bandwidth (which in the ideal scenario is simply inversely proportional to the photon pair rate).

in the stochastic process, there is also the possibility that two photon pairs are created, i.e. there is a significant probability that, instead of a single photon, a double photon or two photons will be emitted simultaneously.

OBJECT OF THE INVENTION

The object of the present invention is to provide a device for generating single photons, or a single-photon source, which avoids the disadvantages mentioned above. In particular, the device should be constructed in a simple and robust manner. The device should preferably have the best possible single-photon characteristic and, at the same time, high single-photon rates.

SUMMARY OF THE INVENTION

In connection with the generation of double photons or pairs of photons emitted simultaneously, it has recently been found that an ensemble of non-interacting quantum emitters in the form of atoms can act as a spectrally selective filter which exponentially attenuates resonant single photons of a transmitted light. In contrast, even when the atoms are weakly coupled to the incident light, resonant photon pairs or a resonant two-photon component of the incident light are resonantly scattered such that a photon pair or two correlated photons are produced in two frequency sidebands, wherein one of the sidebands is "blue-shifted", i.e. shifted toward higher energies, and the other sideband is "red-shifted", i.e. shifted toward lower energies. As they travel through the rest of the atomic ensemble, these correlated photons are attenuated to a lesser extent than the single photons in terms of their intensity, due to the fact that the energies are no longer resonant. A source of photon pairs can thus effectively be created by a sufficiently large number of atoms, cf. S. Mahmoodian et al., Physical Review Letters 121, 143601 (2018).

The core of the present invention is the surprising finding that in the case described, depending on the number of atoms, a perfect destructive interference can occur between a two-photon component of the light that is scattered at these atoms and a two-photon component of the light that is not scattered. More precisely, a perfect destructive interference can occur between that two-photon component which, without interacting with the atoms, transmits in a particular observation direction or toward a particular observation location (in the above terminology, the "two-photon component that is not scattered") and that two-photon-component which is scattered by the atoms in the same observation direction or toward the same observation location. Remarkably, single photons still exhibit finite transmission at this working point, so that in this way a single-photon source can be created. Components of the light that have a higher number of photons, i.e. a three-photon component, four-photon component, etc., statistically play no role except at extremely high intensities, so that the transmitted light consists practically exclusively of single photons. This means that a stream of photons that propagate not jointly, but rather individually, is obtained in the observation direction or at the observation location.

Only when the number of atoms is increased further is the above-described opposite effect obtained, which leads to a light source in which photon pairs dominate.

Of course, other quantum emitters can also be used instead of single atoms.

Accordingly, in a device for generating single photons with an energy E, it is provided according to the invention that the device comprises a plurality of quantum emitters which have at least one determined transition with the energy E from an energy level N* to a lower energy level N1, wherein the quantum emitters are arranged in the region of a propagation path extending from a first region to a second region, the device further comprising at least one light source for emitting light, preferably of one light mode, for propagation along the propagation path, wherein the light has the energy E for resonantly exciting the energy level N*, wherein the quantum emitters are arranged in such a way that only exactly Z quantum emitters are illuminated, which form an optical thickness $\tau>0$ for the light along the propagation path, the number Z lying in a range $Z0\pm10\%$, and wherein Z0 is that number at which, in the second region, a destructive interference between a two-photon component of the light that is scattered at these Z0 quantum emitters and a two-photon component of the light that is not scattered is at a maximum.

"A plurality of quantum emitters" is to be understood to mean "at least two quantum emitters". In practice, embodiment variants with various numbers of quantum emitters are possible, from a few, for example 3 or 5, quantum emitters up to more than $10^4$ quantum emitters.

It should be noted that the energy E or the light need not lie in the optically visible range. This means that the present invention is in principle not limited to a particular range of the electromagnetic spectrum. Theoretically, a single-photon stream can be generated in which the photons have a significantly lower energy than optically visible light—for example in the terahertz range or in the microwave range—or a significantly higher energy than optically visible light—for example in the X-ray range.

In principle, the propagation path is a spatial stretch in which the light propagates from the first region to the second region.

As is clear from what has been stated above, the destructive interference in the second region is substantial, wherein the second region corresponds to some extent to the above-mentioned observation location. In other words, the outgoing (not incoming) light or the outgoing (not illuminating) optical mode is crucial for the destructive interference of the scattered and non-scattered two-photon components. By virtue of said destructive interference, a practically perfect single-photon characteristic can be established in this outgoing light or in this outgoing optical mode.

In the particularly simple case of one laser source and no further optical elements, the propagation path is typically a very narrow spatial region around a straight line, wherein this spatial region preferably does not widen or only barely widens. It should be noted at this point that a laser source need not necessarily be provided for the device according to the invention. Furthermore, one or more optical elements may be provided, which ensure that the propagation path deviates from the simple shape described above, wherein in particular the propagation path need not follow a straight line.

With regard to the at least one light source, it must be stated that this may also comprise a plurality of individual light sources, for example a plurality of laser diodes, and optionally associated optical elements, in particular lenses and/or mirrors and/or filters. Here and below, a light mode is to be understood primarily as a restriction of the light emitted by the light source to a defined spatial region. In this sense, lasers—even without additional optical elements—can typically be regarded as a source of light modes, regardless of whether the cross-section of the emitted laser light has a basic or fundamental mode or higher modes or a multimode structure.

Of course, each transition from an excited energy level to a lower energy level is not characterized by an infinitely sharply defined energy, but rather has a certain bandwidth which, according to Heisenberg's uncertainty principle, is inversely proportional to the lifetime of the respective excited state or energy level. Correspondingly, "light with an energy E for resonantly exciting the energy level N*" does not mean a perfectly sharp energy value E of the light, but rather that the light has a bandwidth around the energy value E, wherein the bandwidth must be of the same order of magnitude as or smaller than the bandwidth of the transition from the energy level N* to the energy level N1.

It should also be noted that the specific energy of a transition and thus the energy of the light for resonantly exciting the energy level associated with the transition can generally depend on the "state" of the quantum emitter, which state can be influenced in particular by the environment of the quantum emitter and by whether the quantum emitter is moving or at rest. By way of example, an atom may be provided as a quantum emitter, wherein this atom has a transition with a particular energy when the atom is free and at rest. This energy may undergo a change when, for example, the atom moves (Doppler effect) or is built into a crystal or is exposed to an electric/magnetic field. When mention is made of a light with the energy for resonantly exciting the corresponding energy level of the atom or quantum emitter, this energy of the light can then be adapted (or else not) to the shifted energy of the transition, as will be explained in greater detail below in the description of exemplary embodiments.

The number Z of quantum emitters illuminated with the light can be influenced by the arrangement of the quantum emitters.

In any case, the arrangement is such that the optical thickness (dimensionless measure, known per se, of how well the light can pass through the arrangement) $\tau>0$ is given for the light, so that an attenuation of the light occurs. This can typically be ensured by arranging at least some of the quantum emitters one behind the other as viewed along the propagation path. In principle, however, cases are also possible in which, viewed along the propagation path, the quantum emitters are arranged exclusively next to one another, in particular exclusively normal to the direction of propagation of the light, and an optical thickness $\tau>0$ for the light is likewise given, even though a geometric thickness of this arrangement is practically zero.

Scattering at Z or Z0 quantum emitters is clearly to be understood as the quantum-mechanical summation of all probability amplitudes for the respective scattering at each of these quantum emitters.

The number Z0 depends on the coupling strength between the quantum emitters and the light, wherein not only are only comparatively low coupling strengths necessary—i.e. in particular in comparison to solutions known from the prior art—but in principle also no lower limit of the coupling strength is required. The coupling strength—and thus also Z0—can also easily be influenced by the arrangement of the quantum emitters, namely by arranging the quantum emitters closer to (for stronger coupling) or further away from (for weaker coupling) the propagation path.

In other words, the above-mentioned arrangement of the Z or Z0 quantum emitters applies to a particular coupling strength between the quantum emitters and the light or is to be selected with regard thereto, the coupling strength being largely dependent on the specific arrangement itself.

For many applications, the aforementioned range for Z around Z0 ensures a sufficient purity of the single-photon characteristic. The latter can be determined, for example, in a manner known per se, by determining the normalized second-order correlation function, $g^{(2)}(\Delta t)$, in a so-called Hanbury Brown-Twiss setup, cf. M. D. Eisaman et al., Review of Scientific Instruments 82, 071101 (2011). $g^{(2)}(\Delta t=0)$ is a measure of the probability that more than one photon will pass through the cross-section of the light beam at the same time. Accordingly, $g^{(2)}(\Delta t=0)=0$ applies to light from a perfect single-photon source. Values of $g^{(2)}(\Delta t=0) \leq 0.01$ can easily be achieved by means of the device according to the invention. At the same time, high single-photon rates can easily be achieved by selecting the intensity of the incident light to be suitably high.

Collection optics for the single-photon stream may optionally be provided in order to avoid the coupling-in of scattered light from the environment.

The device according to the invention solves the above-mentioned problem:

With regard to the construction, it is far less complex than known solutions since no single quantum emitters, which are difficult to prepare, and no large coupling strengths of the quantum emitters are required.

Regardless of the coupling strength of the quantum emitters to the light or the light mode, a perfect single-photon characteristic can always be achieved by coupling the correct number of quantum emitters to the light beam, or by modifying the coupling strength thereof—most easily by way of the relative position of the quantum emitters in the light mode or, for example, via polarization or light mode diameter.

At the same time, the single-photon rate (single photons per s) of the device according to the invention is not defined by the coupling strength of the quantum emitters to the light or by a collection efficiency, but rather can be increased almost at will by increasing the power of the incident light. Only at extremely high intensities is a limit reached, at which higher-numbered photon components then statistically begin to play a role and the probability of the transmission of a three-photon component increases significantly.

Specifically, rates of 0.1*Y are easily achieved with the device according to the invention, where Y is the decay rate of the excited energy level N*. Only at even higher rates does the above-mentioned probability of the transmission of a three-photon component begin to play a role.

For comparison, in known methods which operate using single atoms, the theoretical limit is Y/2, where Y is the decay rate of the excited energy level in question. In practice, however, only with difficulty is it possible to approach this limit in technologically relevant settings, since the emission of the single photons takes place in the entire spatial angle of $4n$ sr and the collection of all the single photons is achieved only with difficulty or suffers from other disadvantages, such as large losses for example, when the light is to be coupled into an optical glass fibre.

The device according to the invention can also be designed to be inherently very robust since relatively large numbers of quantum emitters, typically $>10^4$, are required for low coupling strengths. As a result, the sensitivity to variations in the exact number Z of quantum emitters can theoretically be kept as low as desired. In a typical example, if the variation in the number of quantum emitters follows a Poisson distribution around a mean value, the relative variation in the numbers of quantum emitters fluctuating around the mean value decreases as Z increases, in accordance with $Z^{0.5}/Z$.

In addition, the device according to the invention also has optimal spectral properties: The wavelength of the single-photon source according to the invention is predefined by the resonant wavelength of the quantum emitters. By using different quantum emitters with well-known transitions or quantum emitters with different transitions, it is possible to create a single-photon source with a different, perfectly reproducible wavelength. In addition, it is also possible in principle, in a manner known per se, for example by means of magnetic fields, to influence and to adjust the exact energy of the transitions. At the same time, the single photons are also indistinguishable from a quantum mechanics point of view, which is important for many protocols.

As already mentioned, the light source need not be a laser source. Instead, the light source used could also be a conventional light source, for example a light-emitting diode or a gas discharge lamp, plus a downstream narrow-band filter, in order to ensure a sufficiently narrow bandwidth of the light. Because of the usually inherently sharp bundling of the emitted light beam and the narrow frequency bandwidth thereof required for the application, it is provided in one preferred embodiment of the device according to the invention that the light source is a laser source and preferably comprises at least one laser diode. "Laser source" is to be understood here to mean that the light source can of course also comprise a plurality of individual laser sources. Laser diodes are particularly inexpensive and are available for a wide range of energies.

As already mentioned, when implementing the device according to the invention, there is no restriction to atoms as quantum emitters; instead, various quantum emitters with suitable energy schemes can be used. In one preferred embodiment of the device according to the invention, it is provided that the quantum emitters comprise atoms and/or ions and/or molecules and/or quantum dots and/or defects in crystal structures. In practice, this choice can be used on the one hand to easily select a desired energy of the photons. On the other hand, the coupling strength can also be deliberately influenced by suitably choosing the type of atom/ion/molecule/quantum dot/crystal defect of the respective quantum emitter. Finally, at least some types of these quantum emitters may be provided as a matter of routine, which facilitates practical applications. The crystal structures may be two-dimensional or three-dimensional crystal structures. Suitable crystal defects in crystal structures are, for example, colour centres formed by complexes consisting of in each case one impurity atom and one vacancy, for example a "nitrogen-vacancy centre" (also referred to as an NV centre) in diamond or a "silicon-vacancy centre" (also referred to as an SiV centre) in diamond.

In one preferred embodiment of the device according to the invention, it is provided that at least one optical element is provided for defining the propagation path. The at least one optical element for defining or configuring the propagation path is at least one element known per se, for example at least one lens, by which the light is focused into a particular spatial region, and/or at least one optical fibre or at least one optical waveguide, by means of which the light is guided, and/or at least one mirror and/or at least one aperture, by which the cross-section of the incident light is restricted. Thereby, the at least one optical element may be provided regardless of which type of light source is used, i.e. in the case of both laser sources and other light sources. Preferably, the at least one optical element is tailored to the light source used.

In one preferred embodiment of the device according to the invention, it is provided that an optical waveguide comprising a waveguide core is provided for guiding the light, and that the Z quantum emitters are arranged in a near field, wherein the near field consists of the electromagnetic field of the light in the waveguide core and outside the waveguide core.

Optical waveguides are known per se. The waveguide core constitutes a first optical medium having a refractive index n1 and is surrounded by at least one second optical medium having a refractive index n2, or the waveguide core adjoins, by way of an optical interface, the at least one second optical medium, which forms a cladding for the waveguide core. For the light, n1>n2 applies. The latter ensures that the total reflection of the light and thus the transporting of the light in the waveguide core.

In spatial terms, the light guided in the waveguide is not restricted to the waveguide core, but rather projects into the at least one second optical medium (as an evanescent wave). This means that the near field also exists outside the waveguide core. This means that the quantum emitters can also be arranged outside the waveguide core, in particular at a certain normal distance from a surface of the waveguide core that forms the optical interface, the normal distance being measured in a direction normal to the surface. By way of example, such a normal distance may lie in the range of up to $5*\lambda_0$ or up to $20*\lambda_0$, where $\lambda_0$ is the vacuum wavelength of the light of energy E.

Widely used materials for optical waveguides and waveguide cores are, for example, Si, GaAs, glass or quartz glass or $SiO_2$.

The waveguide defines the propagation path, it being possible for the quantum emitters to be arranged in and/or outside the waveguide core.

The use of an optical waveguide facilitates miniaturization, so that it is possible for the device to be integrated in integrated optical circuits, in particular in/on chips.

As stated, optical waveguides are known per se. To enable a particularly simple and inexpensive implementation, it is provided in one particularly preferred embodiment of the device according to the invention that the waveguide is designed as an optical fibre.

As already mentioned, the use of waveguides is ideal for miniaturization and integration in optical chips, wherein the waveguide core is designed as an optical conductor track in or on a substrate. Accordingly, it is provided in one particularly preferred embodiment of the device according to the invention that the waveguide core is arranged on a substrate, wherein the waveguide core is preferably at least in sections sunk into the substrate. The quantum emitters can accordingly likewise be sunk into the substrate. By way of example, the substrate used may be a photonic Si chip or an $SiO_2$ substrate. Optical conductor tracks can be produced, for example, using common lithography methods and widely used materials, for example glass, quartz glass, Si, GaAs, etc.

In one preferred embodiment of the device according to the invention, it is provided that a photonic-crystal fibre having a hollow core is provided for guiding the light, wherein the quantum emitters are preferably arranged in the hollow core.

Photonic crystal fibres for guiding light are known per se and have a core surrounded by a photonic crystal structure (the so-called "cladding"), which forms a photonic crystal with a photonic band gap. Accordingly, photons having an energy that lies in the photonic band gap cannot occur in said photonic crystal structure. This therefore results in essentially two variants of photonic crystal fibres that can in principle be used in the present invention, the respective photonic crystal fibre defining the propagation path.

On the one hand, these fibres may have a core that is solid. In this case, this is essentially a waveguide as described above. When such photonic crystal fibres are used in an embodiment of the device according to the invention, the quantum emitters, as already described in detail above, are arranged in the near field of the light guided in the core. This means that the quantum emitters need not necessarily be arranged in the core, but rather can also be arranged outside the core.

On the other hand, the photonic crystal fibres may have a hollow core, in which light can be guided if the light has an energy that lies in the band gap of the photonic crystal structure surrounding the core.

The hollow core not only makes it possible to guide light, but also makes it possible for quantum emitters to be arranged in the core and thus in the region of the propagation path in a way that is easy to implement and highly defined both spatially and quantitatively.

In particular, the quantum emitters may in this case be introduced in gas form into the core, it being possible for the gas to consist of the quantum emitters or to include the latter. The hollow core also facilitates very precise metering of the quantity of gas introduced into the core, i.e. the number of quantum emitters introduced into the core can in this case be specified or determined very precisely.

For the sake of completeness, it should be noted that, also for such photonic crystal fibres having a hollow core, it is also fundamentally the case that the quantum emitters need only be arranged in the near field of the light guided in the hollow core. This means that, in this case too, the quantum emitters need not necessarily be arranged exclusively in the (hollow) core, but rather can also be arranged outside the (hollow) core.

In one preferred embodiment of the device according to the invention, it is provided that a crystal is arranged in the propagation path, and that the Z quantum emitters are formed by crystal defects, preferably by impurity atoms and/or vacancies, particularly preferably by dopant atoms, in the crystal.

Preferably, the crystal is transparent to the light used and barely attenuates the light.

As already mentioned, suitable crystal defects are, for example, colour centres formed by complexes consisting of in each case one impurity atom and one vacancy, for example a "nitrogen-vacancy centre" (also referred to as an NV centre) in diamond or a "silicon-vacancy centre" (also referred to as an SiV centre) in diamond. Such colour centres can be created in a manner known per se, for example by ion implantation. The arrangement and the number Z of the resulting quantum emitters can accordingly be deliberately influenced.

Impurity atoms themselves also constitute crystal defects. In this case, the number Z can be influenced by the distribution of the impurity atoms in the crystal, for example if the impurity atoms are introduced by diffusion and the concentration of the impurity atoms in the crystal accordingly follows a Gaussian diffusion profile.

In general, i.e. for any crystal defects, the number Z also depends on the size and the specific arrangement of the crystal in the propagation path. Furthermore, at least one optical element may be provided, in order to define the propagation path in the crystal in such a way that only a region of the crystal containing Z quantum emitters is illuminated. Lenses and/or apertures are particularly suitable for this purpose.

Thereby, the region can be selected in such a way that the illuminated quantum emitters have a desired or particular coupling strength.

This embodiment is characterized by particular robustness.

In particular, the excitation of the energy level $N^*$ is unproblematic, since the quantum emitters are built into the crystal and therefore cannot move freely, so that, when the crystal is at rest, no Doppler shift occurs, i.e. an energy shift due to the Doppler effect, which could lead out of the bandwidth of the transition. In particular, therefore, the resonant excitation of the energy level $N^*$ with the light of energy E (and the corresponding bandwidth, see above) is possible without any problem. It should also be noted in this regard that, although other effects in solids may in principle lead to energy shifts, many of these effects can typically be sufficiently reduced by cooling the respective solid, as known per se.

However, even if there are energy shifts due to effects that cannot be sufficiently reduced by cooling—or if no cooling or only limited cooling is possible for other reasons—the functioning of the device according to the invention can be ensured as follows. In the case of quantum emitters that have a further transition with the energy E' from the energy level N1 to a lower energy level N0, a two-stage scheme can be used for this, in order to select those quantum emitters for which said energy shifts are sufficiently small (or lie in a particular range). Said two-stage scheme is explained in greater detail below in connection with embodiment variants in which the quantum emitters are in gas form. It is based on the fact that one portion of the quantum emitters is excited to the energy level N1 by a further light of energy E' or close to E', wherein this portion of the emitters has only a low spectral distribution of the transition N0 to N1 and of the transition N1 to $N^*$. The resulting spectral distribution of the transition N1 to $N^*$ of the selected portion of the emitters is in particular lower than the spectral distribution of the transition N1 to $N^*$ of all the emitters present in the solid body. Then, in these quantum emitters, the light of energy E, which now represents the energy of the transition N1 to $N^*$ of the selected quantum emitters, can be used to deliberately excite the energy level $N^*$, starting from the energy level N1, in order ultimately to generate a single-photon stream of energy E by using the described scattering dependent on the number of photons.

For the sake of completeness, it should also be noted in this connection that, due to the low light energies that typically play a role (typically from the UV-C to the near IR-B range, in particular corresponding to vacuum wavelengths in the range from 100 nm to 2000 nm), recoil energies are unproblematic and do not lead out of the bandwidth of the transition. This is of course all the more true when using the device according to the invention to generate single photons of even lower energy, for example to generate single photons in the (longer-wave) terahertz range or in the microwave range. These recoil energies result from the recoil that occurs when emitting or absorbing photons due to the momentum of the photons.

It would be conceivable to implement the aforementioned exemplary embodiment using, for example, a diamond crystal, into which impurity atoms and/or vacancies are built.

Because they are readily available in high degrees of purity, semiconductors are particularly suitable in practice for use in the aforementioned exemplary embodiment. Then, particularly suitable impurity atoms are dopant atoms that can be introduced into the crystal in a controlled manner using techniques known per se. In one particularly preferred embodiment of the device according to the invention, it is accordingly provided that the material of the crystal comprises silicon, and that the dopant atoms comprise boron atoms or phosphorus atoms. This means that both a p-doping (trivalent boron) and an n-doping (pentavalent phosphorus) can be provided.

As already stated, the device according to the invention functions even when there is weak coupling between the quantum emitters and the light, since the weak coupling is compensated to a certain extent by a large number of quantum emitters. Accordingly, the quantum emitters also need not necessarily be in a quasi-solid state of aggregation, but instead in theory may also be in liquid form or be present in a liquid or may be in gas form or present in a gas. Thereby, the quantum emitters may for example be present in a transparent liquid/in a transparent gas or may themselves substantially form the liquid/gas. Accordingly, in one preferred embodiment of the device according to the invention, it is provided that the quantum emitters are in gas form in the region of the propagation path. The gas may be present, for example, in a transparent container or in a container having a transparent inlet for the light and a transparent outlet for the single-photon stream. However, it would also be conceivable that the light source and optionally a detector or conductor for the single-photon stream are located in the gas. Furthermore, it would also be conceivable to shine light through a gas flowing in the region of the propagation path. As already described above, the gas may also be arranged in the hollow core of a photonic crystal fibre, wherein the coupling of the light into and out of the photonic crystal fibre or into and out of the hollow core thereof takes place in a manner known per se. Furthermore, the gas may also be arranged on a waveguide, in particular on an optical fibre or on a waveguide sunk into a substrate, so that the quantum emitters can be arranged at least in the near field.

The number Z of quantum emitters in a particular region of the propagation path, which in particular can be defined by means of the at least one optical element, is subject to certain statistical variations due to the thermal movement of the quantum emitters in the gas. As already explained above, however, the relative variation can be kept sufficiently small by selecting a correspondingly large number Z.

Due to the thermal movement, the quantum emitters have a velocity distribution that can be described at least approximately by the Maxwell-Boltzmann distribution. According to this distribution and depending on the temperature, the quantum emitters may sometimes have velocities that are so great that the Doppler shift associated with the respective velocity (to put it loosely, due to their movement the quantum emitters do not "see" the light with the energy E, but rather a light with an energy that is (Doppler-)shifted) is larger than the bandwidth of the transition from energy level N* to N1. In the case of such quantum emitters, in principle no resonant excitation can take place using the light with the energy E (and the corresponding bandwidth, see above).

To illustrate an example, consider, as quantum emitters, gaseous caesium atoms and the Cs-$D_2$ transition with an energy of approximately 1.45 eV and a vacuum wavelength of approximately 852 nm and a frequency of approximately 352 THz. The lifetime of approximately 30.5 ns relevant to the transition results in a bandwidth of the transition of approximately $2*10^{-8}$ eV, which corresponds to a frequency of approximately 5 MHz. The maximum of the Maxwell-Boltzmann distribution (obtainable by derivation and zeroing of the velocity distribution) yields $v_m=(2*k_B*T/m)^{0.5}$ as the most probable velocity of a gas particle, where $k_B$ denotes the Boltzmann constant, T the temperature, and m the mass of the gas particle. For the Cs atoms having a mass of 132.9 u (atomic mass units), this therefore results in $v_m \approx 193.7$ m/s at T=300 K. The resulting Doppler shift is approximately 227 MHz or $9.4*10^{-7}$ eV and is therefore significantly larger than the bandwidth of the transition. The resonant excitation of the transition would therefore not be possible with this Doppler shift.

On the other hand, however, the Maxwell-Boltzmann distribution also ensures that there are sufficiently slow quantum emitters for which the Doppler shift is smaller than the bandwidth of the transition from energy level N* to N1. This means that, for these quantum emitters, the Doppler shift is so small that resonant excitation is possible. Typically, the proportion of these quantum emitters in relation to the total number of quantum emitters is in the single-digit percentage range.

By ensuring that a sufficiently large number of quantum emitters are illuminated overall, it can thus also be ensured that statistically the number Z of illuminated quantum emitters is those that have a sufficiently low velocity. To this end, not only can the propagation path be suitably defined, but for example the temperature can be suitably selected in order to adjust the number of sufficiently slow quantum emitters. Furthermore, for example, the total number of quantum emitters can be varied/increased—in particular by varying/increasing the gas pressure if the gas substantially consists only of the quantum emitters—in order thus also to vary/increase the number of sufficiently slow quantum emitters.

In one particularly preferred embodiment of the device according to the invention, it is provided that the quantum emitters have a further transition with the energy E' from the energy level N1 to a lower energy level N0, that at least one light source is provided for emitting further light, preferably of a further light mode, wherein the further light has the energy E', in order to resonantly excite the energy level N1 at quantum emitters and then to excite the energy level N* using the light of energy E at Z of these quantum emitters. In a way, therefore, the further light serves to select from the gas, by way of the resonant excitation of the energy level N1, those quantum emitters that are sufficiently slow, i.e. for which the Doppler shift is sufficiently small—which, to put it bluntly, "are substantially at rest". These quantum emitters are then in principle available for the following resonant scattering process, in which the level N* is resonantly excited starting from N1, wherein Z of these quantum emitters are illuminated with the light of energy E.

Preferably, the further light is selected to be narrow-band, i.e. having a bandwidth that is significantly smaller than that of the further transition.

In other words, the illumination with the further light of energy E' determines the arrangement of the quantum emitters, from which arrangement Z quantum emitters are subsequently illuminated with the light of energy E. Specifically, if the quantum emitters are slow enough that—starting from the energy level N0—the energy level N1 can be resonantly excited by means of the further light of energy E', then these quantum emitters are also slow enough that the energy level N*—now starting from the energy level N1—can subsequently be resonantly excited by means of the light of energy E.

It should be noted that the light of energy E and the light of E' can preferably be selected in a so-called "Doppler-free" configuration. In this configuration, the light rays propagate in opposite, parallel or at least approximately parallel directions. Also possible is a configuration in which the light rays propagate in the same parallel or at least approximately parallel directions.

Furthermore, the transitions and the light of energy E and E' are preferably selected such that the wavelengths of light of energy E and E' differ significantly from one another, particularly preferably by at least 10%. In practice, this makes it easier to separate the generated single-photon stream from the "selection light" of energy E', for example by means of optical filters.

The number Z can also be influenced as described above (definition of the propagation path, in particular by means of the at least one optical element; total number of quantum emitters, in particular gas pressure; temperature). Overall, the function of the device according to the invention can be particularly well controlled on the basis of the described resonant scattering process.

It is conceivable that the at least one light source for emitting further light is integrated in the at least one light source for emitting the light or is formed by the latter.

The described embodiment variant can be implemented, for example, by means of vapours from alkali metal atoms, for which a suitable choice of energy levels can be ensured by means of selection rules. Accordingly, in one particularly preferred exemplary embodiment of the device according to the invention, it is provided that the quantum emitters comprise lithium atoms and/or sodium atoms and/or potassium atoms and/or rubidium atoms and/or caesium atoms.

For example, the following levels (in ascending order of energy) N0, N1, N* can be selected (transitions upon excitation: from N0 to N1 and from N1 to N*):

$N^*=(x-1)D$
$N1=xP$
$N0=xS$ where x=2 for Li, x=3 for Na, x=4 for K, x=5 for Rb, and x=6 for Cs.

It should be noted that it is also possible to specifically use quantum emitters that belong to a particular velocity class to generate single photons in the manner according to the invention. This means that light with an energy that can only resonantly excite the energy level N* as a result of a certain Doppler shift is deliberately selected here (for example by using a tunable laser as the light source).

Accordingly, the energy level N* can be resonantly excited only in those quantum emitters that have a velocity in a suitable range, or only these quantum emitters contribute to the resonant scattering. These quantum emitters are preferably first selected by the further light, wherein the energy of the further light is deliberately selected (for example by using a tunable laser as the further light source) in such a way that the energy level N1 can be resonantly excited only as a result of the particular Doppler shift. It should also be noted in this regard that the quantum emitters selected in this way exhibit only a narrow spectral broadening of the transition N1 to N* due to the Doppler effect. In these selected quantum emitters, the energy level N* can then be deliberately excited, starting from N1, using the light that has the particular Doppler shift. With a device designed in this way, single photons are thus generated that have an energy with the particular Doppler shift.

Finally, it should again be noted (cf. above) that the two-stage scheme described can also be applied to embodiments in which the quantum emitters are formed by crystal defects in a crystal, in order to be able to take into account any shifts in transition energies that may occur there.

BRIEF DESCRIPTION OF THE FIGURES

The invention will now be explained in greater detail on the basis of exemplary embodiments. The drawings are given by way of example and are intended to explain the concept of the invention but not to restrict it in any way or even exhaustively reflect it.

In the drawings.

WAYS OF CARRYING OUT THE INVENTION

Figure 1:
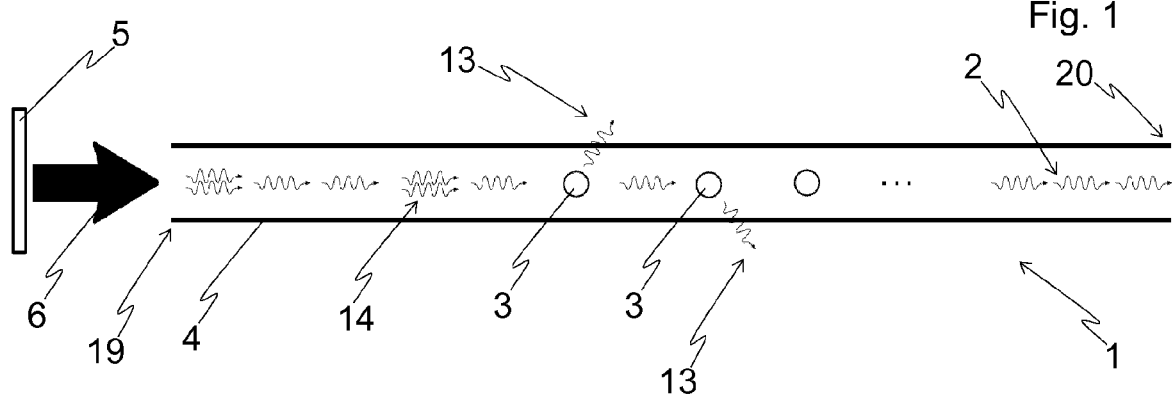
FIG. 1 shows a schematic diagram of the basic mode of operation of the device according to the invention.

FIG. 1 shows a schematic illustration of the underlying principle of the present invention of a single-photon source or a device 1 for generating single photons or a single-photon stream 2 of a particular energy E. The device 1 uses the principle of photon-number-dependent scattering of light 6 of energy E by single quantum emitters 3, wherein the quantum emitters 3 can be implemented for example by atoms, ions, molecules, quantum dots or defects in crystal structures. A quantum emitter 3, which is coupled to the light 6 or to a light field with a well-defined optical mode, such as, for example, a laser beam from a laser source 5, interacts differently with the light 6 depending on whether one or two photons, or more specifically whether a single-photon component or a two-photon component 14 of the light 6, arrive at the quantum emitter 3. Here, light mode is to be understood to mean that the light 6 propagates along a particular propagation path 4 (indicated by the two solid black lines in.

FIG. 1), which extends from a first region 19 to a second region 20. The quantum emitters 3 are arranged in the region of the propagation path 4. One or more optical elements may optionally be provided, in order to define the propagation path 4 more precisely.

Said components of the light 6 may be scattered at the respective quantum emitter 3 or also may not be scattered. Interference thus occurs between a non-scattered two-photon component and a scattered two-photon component of the outgoing light 6 for a selected observation direction or at a selected observation location (for reasons of clarity and presentation, only the two-photon component 14 of the incoming light 6 is shown in FIG. 1, but not the scattered and the non-scattered two-photon component). In the device 1, the observation direction is predefined by the propagation path 4, and the observation location corresponds to the second region 20.

A photon-number-dependent phase shift of the light 6 occurs, which in turn can lead to destructive interference of the scattered two-photon component with the non-scattered two-photon component at the observation location or in the second region 20. If the correct number Z0 of quantum emitters 3 is coupled to the light field mode, the point of perfect destructive interference can be reached, at which the losses for two jointly propagating photons are 100%. Remarkably, single photons still exhibit finite transmission at this working point. As a result, the light 6 transmitted through the ensemble of quantum emitters 3 has a perfect single-photon characteristic, apart from higher-order photon components (three-photon component, four-photon component, etc.) that statistically only play a role at extremely high intensities, and the single-photon stream 2 is obtained. This means that two photons never come through the ensemble at the same time.

In FIG. 1, total losses 13 are indicated by the wavy arrows pointing away from the propagation path 4, these losses being caused by the destructive interference between the scattered and non-scattered two-photon components and also comprising the attenuation of the single-photon component.

Said scattering of the two-photon component 14 of the light 6 is a resonant scattering, i.e. the quantum emitters 3 have a transition with the energy E from an energy level N* to a lower energy level N1, the energy level N* being excited by the light 6 or the two-photon component 14 of energy E thereof.

For the sake of good order, it should also be noted at this point that the energy E is to be understood not as an infinitely sharp value, but rather as a value that has a certain bandwidth, which is defined by the bandwidth of said transition or by the lifetime of the energy level N*. Accordingly, "light 6 of energy E (for resonantly exciting the energy level N*)" means not a perfectly sharp energy value E of the light 6, but rather that the light 6 has a bandwidth around the energy value E, it being necessary for the bandwidth to be of the same order of magnitude as or smaller than the bandwidth of the transition from the energy level N* to the energy level N1.

According to the invention, the arrangement of the quantum emitters 3 is such that only exactly Z quantum emitters 3 are illuminated, which form an optical thickness $\tau>0$ for the light 6 along the propagation path 4, wherein the number Z lies in a range Z0±10%, and wherein Z0 is that number at which the destructive interference between the two-photon component of the light 6 that is scattered at these Z0 quantum emitters 3 and the two-photon component of the light 6 that is not scattered is at a maximum. In practice, the aforementioned range for Z around Z0 ensures a sufficient purity of the single-photon characteristic of the single-photon stream 2 for many applications.

Figure 2:
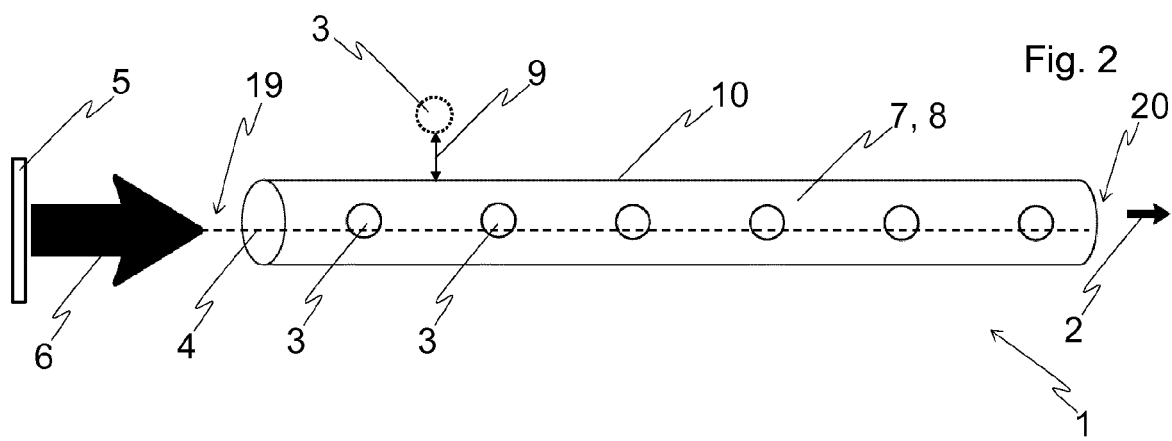
FIG. 2 shows a schematic diagram of an embodiment of the device according to the invention with an optical fibre, wherein quantum emitters are arranged in the latter.

In the exemplary embodiment of FIG. 2, a waveguide in the form of an optical fibre 7 is provided, into which the light 6 from a laser source 5 is coupled in a manner known per se, and which defines the propagation path 4 (indicated by the dashed line in FIG. 2). It should be noted that the propagation path need not be rectilinear, but rather—in a manner corresponding to the specific course of the optical fibre 7—may also be curved practically at will. The optical fibre 7 comprises a fibre core 8 or a waveguide core for guiding the light 6.

Optical waveguides that have a waveguide core are known per se. The waveguide core or fibre core 8 constitutes a first optical medium having a refractive index n1 and is surrounded by at least one second optical medium having a refractive index n2 (not shown in FIG. 2 for reasons of clarity), or the waveguide core adjoins, by way of an optical interface, the at least one second optical medium, which forms a cladding for the waveguide core. In the exemplary embodiment shown, the optical interface is formed by the surface 10 of the fibre core 8. For the light 6, n1>n2 applies. The latter ensures the total reflection of the light 6 and thus the transporting of the light 6 in the waveguide core or fibre core 8.

When using optical fibres 7 in practice, particularly in data transfer applications, use is typically made of light 6 that has an energy corresponding to a vacuum wavelength $\lambda_0$ of the light 6 of from approximately 100 nm to approximately 2000 nm, in particular from approximately 850 nm to 1550 nm.

The Z quantum emitters 3 are arranged in a near field, wherein the near field consists of the electromagnetic field of the light 6 in the waveguide core or fibre core 8 and outside the fibre core 8. This means that the Z quantum emitters 3 need not necessarily be arranged within the fibre core 8, as in the exemplary embodiment of FIG. 2, but rather can also be arranged outside the fibre core 8, provided that they are arranged close enough to the fibre core 8 to be able to couple sufficiently strongly to the near field. Such an arrangement outside the waveguide core is illustrated in FIG. 2 by the quantum emitter 3 shown in dotted line outside the fibre core 8, wherein this quantum emitter 3 is at a certain normal distance 9 from the surface 10 of the fibre core 8, the normal distance 9 being measured normal to the surface 10. To ensure sufficient coupling of the quantum emitters 3 to the near field, the normal distance 9 may lie for example in the range of up to $5*\lambda_0$ or up to $20*\lambda_0$, where $\lambda_0$ is the vacuum wavelength of the light 6 of energy E. In this case, the light field need not drop to exactly zero outside this normal distance 9.

The light 6 guided in the optical fibre 7 propagates through the ensemble of Z quantum emitters 3, which are arranged in the fibre core 8 and which in particular may be impurity atoms or quantum dots. The quantum emitters 3 are arranged one behind the other, as viewed along the propagation path 4, and form an optical thickness T greater than zero, as a result of which the transmission of the light 6 is fundamentally attenuated. This results in the above-described resonant scattering of the two-photon component 14 of the light 6 at the quantum emitters 3 and in the destructive interference between the scattered two-photon component and the non-scattered two-photon component. A single-photon stream 2 accordingly exits from the optical fibre 7, which stream is of course significantly attenuated in comparison to the intensity of the incoming light 6, but still has a finite intensity or a relatively high rate of single photons per second (indicated in FIG. 2 by the different-sized arrows for the incoming light 6 and the single-photon stream 2).

Figure 5:
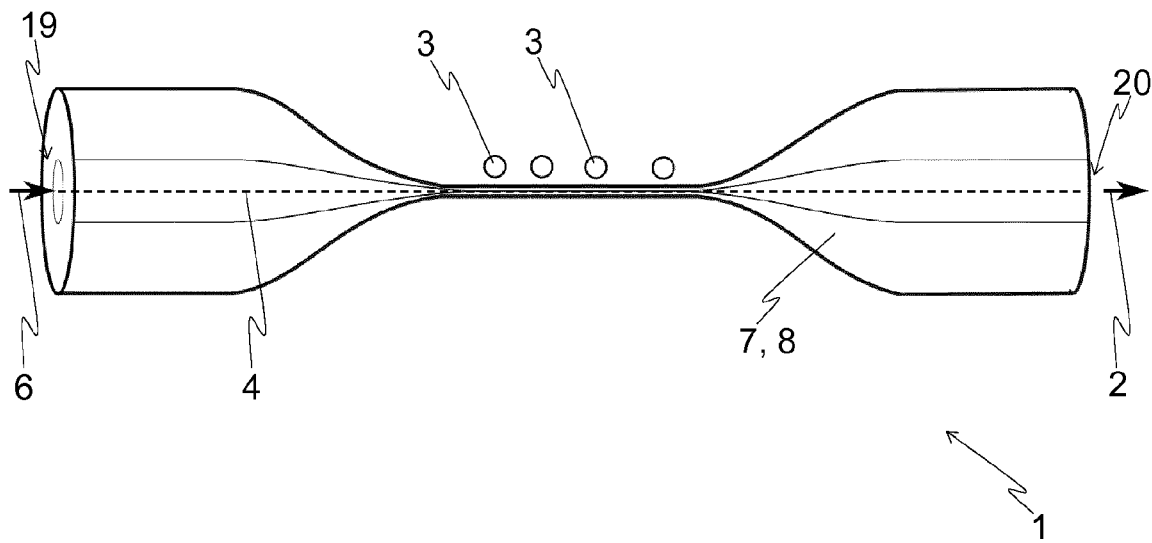
FIG. 5 shows a schematic diagram of another embodiment of the device according to the invention with an optical fibre, wherein the quantum emitters are arranged outside the fibre.

FIG. 5 shows a further exemplary embodiment with an optical fibre 7, wherein in this case the quantum emitters 3 are arranged not in the fibre core 8, but rather outside the fibre core 8. Specifically, the fibre core 8 has a region with a narrowed cross-section or with a very small lateral dimension, the quantum emitters 3 being arranged along this region. This arrangement can take place in a manner known per se, for example by means of an optical trap, cf. for example R. Mitsch et al., Physical Review A 89, 063829 (2014). By way of example, the quantum emitters 3 may be Cs atoms, wherein the transition between the energy levels N* and N1 is defined by the Cs-$D_2$ line with a vacuum wavelength $\lambda \approx 852$ nm.

The above-described resonant scattering of the two-photon component 14 of the light 6 at the quantum emitters 3 and the destructive interference between the scattered two-photon component and the non-scattered two-photon component in the second region 20 thus also occur in the exemplary embodiment of FIG. 5, so that a single-photon stream 2 exits from the optical fibre 7.

Figure 3:
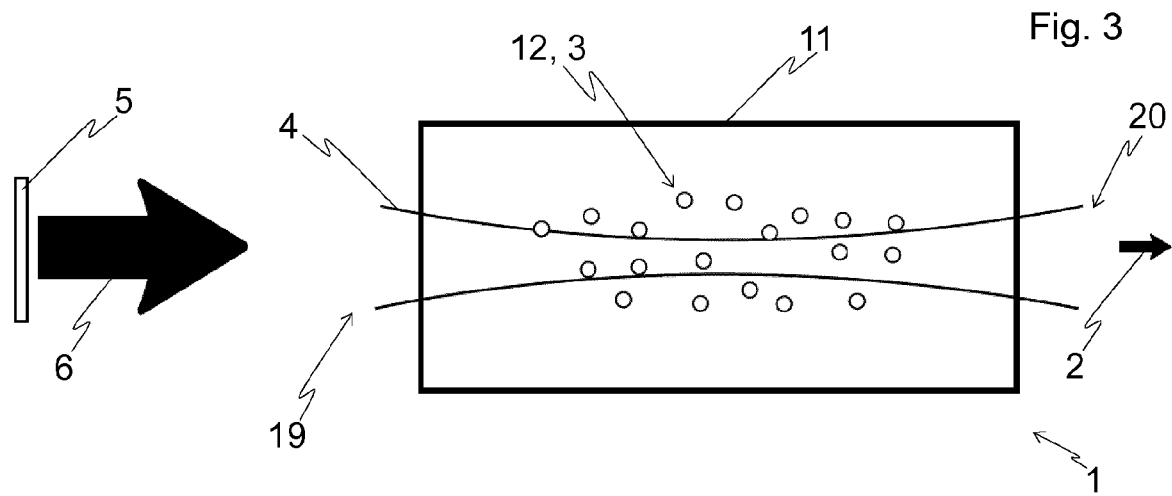
FIG. 3 shows a schematic diagram of another embodiment of the device according to the invention, wherein the quantum emitters are impurity atoms in a crystal.

FIG. 3 shows a schematic diagram of another embodiment of the device 1 according to the invention, wherein the quantum emitters 3 are implemented by crystal defects in the form of impurity atoms 12 in a crystal 11. By way of example, the crystal 11 may be a semiconductor crystal, in particular a silicon crystal, wherein dopant atoms, for example boron atoms or phosphorus atoms, are provided as impurity atoms 12. The crystal 11 is transparent to the light 6 used and barely attenuates the light 6.

Also in this exemplary embodiment, one or more optical elements (not shown) may be provided in order to define the propagation path 4 (indicated by the curved solid lines in FIG. 3). By way of example, at least one lens (not shown) may be provided for focusing the light 6 onto a limited spatial region of the crystal 11, resulting in the propagation path 4 shown in FIG. 3. The Z quantum emitters 3 illuminated by the light 6 are arranged in the region of this propagation path 4. The above-described resonant scattering of the two-photon component 14 of the light 6 at the quantum emitters 3 and the destructive interference between the scattered two-photon component and the non-scattered two-photon component in the second region 20 again occurs. A single-photon stream 2 thus exits from the crystal 11, which stream is of course significantly attenuated in comparison to the power of the incoming light 6, but still has a finite power or a relatively high rate of single photons per second (indicated in FIG. 3 by the different-sized arrows for the incoming light 6 and the single-photon stream 2).

Figure 4:
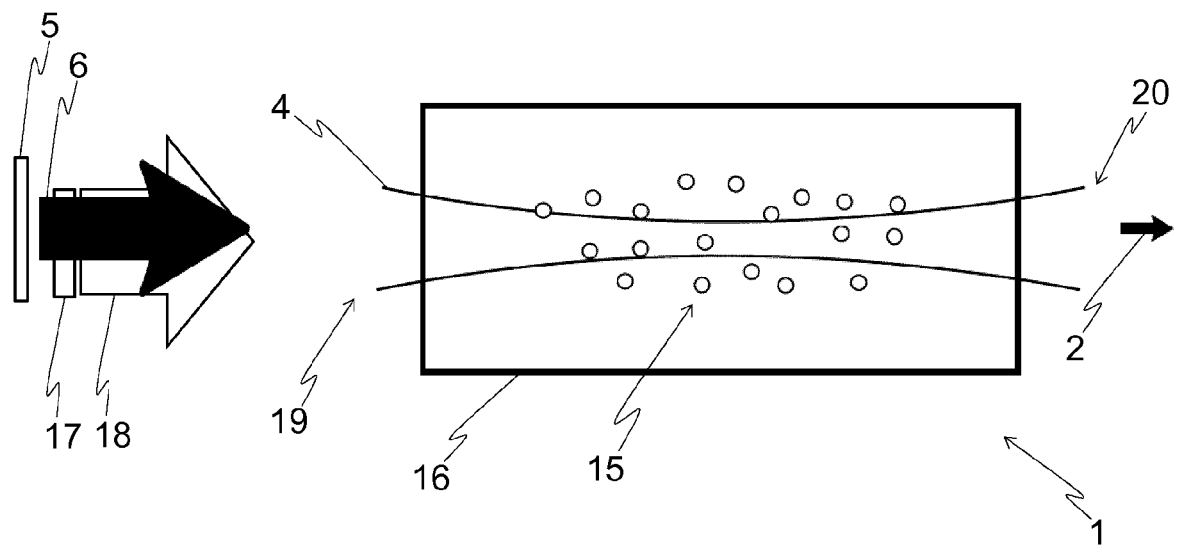
FIG. 4 shows a schematic diagram of another embodiment of the device according to the invention, wherein the quantum emitters are in gas form.

FIG. 4 shows a schematic diagram of another embodiment of the device 1 according to the invention, wherein the quantum emitters 3 are in gas form. In particular, the quantum emitters 3 may in this case be formed by atoms; by way of example, the gas from quantum emitters 3 may be vaporized alkali metal atoms. In principle, the gas from quantum emitters 3 may be part of another gas, in particular a transparent or barely absorbent gas. In the exemplary embodiment shown, a gas 15 is illustrated which consists only of atomic quantum emitters 3.

In the exemplary embodiment shown, the gas 15 is arranged in a container 16 that is transparent to the light 6, so that the light 6 can pass largely unhindered through the walls of the container 16. This means that an attenuation of the light 6 when passing through the container is largely caused only by the gas 15.

Also in this exemplary embodiment, one or more optical elements (not shown) may be provided, in order to define the propagation path 4 (indicated by the curved solid lines in FIG. 4). By way of example, at least one lens (not shown) may be provided for focusing the light 6 onto a limited spatial region within the container 16, resulting in the propagation path 4 shown in FIG. 4. The Z quantum emitters 3 illuminated by the light 6 are arranged in the region of this propagation path 4.

It should be noted that, instead of the container 16, a photonic crystal fibre that has a hollow core may also be provided for example, the gas 15 of the quantum emitters 3 being arranged in the hollow core. The photonic crystal fibre or the course of its hollow core at the same time defines the propagation path 4.

The arrangement of these Z quantum emitters 3 in the gas 15 is in any case not static, but rather is a momentary arrangement since the quantum emitters 3 move. The velocity distribution of the quantum emitters 3 can be described at least approximately by the Maxwell-Boltzmann distribution. Due to the Doppler effect, the energy E of the transition between the energy levels N* to N1 is shifted as a function of the velocity of the respective quantum emitter 3 (so-called "Doppler shift"). Depending on the temperature, and according to the velocity distribution, there are more or fewer atoms having a velocity that is so great that the resulting Doppler shift is larger than the bandwidth of the transition, so that a resonant excitation of the energy level N* by means of the light 6 of energy E is not possible for these atoms.

To illustrate an example, consider, as quantum emitters, gaseous caesium atoms and the Cs-$D_2$ transition with an energy of approximately 1.45 eV and a vacuum wavelength of approximately 852 nm and a frequency of approximately 352 THz. The lifetime of approximately 30.5 ns relevant to the transition results in a bandwidth of the transition of approximately $2*10^{-8}$ eV, which corresponds to a frequency of approximately 5 MHz. The maximum of the Maxwell-Boltzmann distribution yields $v_m \approx 193.7$ m/s as the most probable velocity $v_m$ of a Cs atom at a temperature of T=300 K. The resulting Doppler shift is approximately 227 MHz or $9.4*10^{-7}$ eV and is therefore significantly larger than the bandwidth of the transition.

According to the Maxwell-Boltzmann distribution, however, there is also a fraction of atoms that are so slow that the Doppler shift does not lead out of the bandwidth of the transition. For these atoms, a resonant excitation by means of the light 6 of energy E is still possible. In the exemplary embodiment of FIG. 4, it can be ensured, by suitably selecting the propagation path 4, that statistically exactly Z quantum emitters 3 of the gas 15 are illuminated, these Z quantum emitters 3 being slow enough for resonant excitation of the energy level N*.

It should be noted that, in the above-mentioned variant with the photonic crystal fibre, the propagation path 4 is predefined by the course of the hollow core, but the latter represents a very precisely defined volume. The number of quantum emitters 3 arranged in the hollow core can therefore be set very precisely, as a result of which it is likewise possible to ensure that statistically exactly Z quantum emitters 3 of the gas 15 are illuminated, these Z quantum emitters 3 being slow enough for resonant excitation of the energy level N*.

With the device 1 of the exemplary embodiment of FIG. 4, a two-stage method is implemented, in order to be able to control with particular ease the function of the device 1 according to the invention by using the described resonant scattering process. First, from all the quantum emitters 3 of the gas 15, those that are slow enough for resonant scattering with the light 6 are pre-selected; of these, in turn, Z quantum emitters 3 are then illuminated with the light 6. To this end, the quantum emitters 3 have a further transition with the energy E' from the energy level N1 to a lower energy level N0, and a further laser source 17 is provided for emitting further light 18, preferably of a further light mode, the further light 18 having the energy E'. In the exemplary embodiment shown, the further light 18 impinges on the quantum emitters 3 in the same and/or parallel direction or approximately in the same and/or parallel direction as the light 6; however, an arrangement running in opposite directions would also be conceivable for example. The design is as follows: If the quantum emitters 3 are slow enough that the energy level N1—starting from the energy level N0—can be resonantly excited by means of the further light 18 of energy E', then these quantum emitters 3 are also slow enough that subsequently the energy level N*—now starting from the energy level N1—can be resonantly excited by means of the light 6 of energy E. Only the arrangement of these Z quantum emitters 3 then plays a role for the resonant scattering process, with the destructive interference occurring between the scattered two-photon component and the non-scattered two-photon component of the light 6. Exiting from the container 16, therefore, is a single-photon stream 2 which is of course significantly attenuated in comparison to the intensity of the incoming light 6 but still has a finite intensity and a relatively high rate of single photons per second (indicated in FIG. 4 by the different-sized arrows for the incoming light 6 and the single-photon stream 2).

Vapours from alkali metal atoms, in particular from sodium, rubidium or caesium atoms, are suitable for implementing this exemplary embodiment. For caesium atoms, for example, the following atomic energy levels (in ascending order of energy) N0, N1, N* can be selected (transitions upon excitation: from N0 to N1 and from N1 to N*): N*=5D, N1=6P and N0=6S.

LIST OF REFERENCE SIGNS 1 device
2 single-photon stream
3 quantum emitter, in particular atom, ion, molecule or quantum dot
4 propagation path
5 laser source
6 light
7 optical fibre
8 fibre core
9 normal distance
10 surface of the fibre core
11 crystal
12 impurity atoms
13 total losses
14 two-photon component of the incoming light
15 atomic gas
16 container for the gas
17 further laser source
18 further light
19 first region
20 second region

The invention claimed is:

1. A device for generating single photons with an energy E, comprising a plurality of quantum emitters which have at least one determined transition with the energy E from an energy level N* to a lower energy level N1,
wherein the quantum emitters are arranged in the region of a propagation path extending from a first region to a second region,
the device further comprising at least one light source for emitting light for propagation along the propagation path,
wherein the light has the energy E for resonantly exciting the energy level N*,
wherein the quantum emitters are arranged in such a way that only exactly Z quantum emitters are illuminated, which form an optical thickness T>0 for the light along the propagation path, the number Z lying in a range Z0±10%, and
wherein Z0 is that number at which, in the second region a destructive interference between a two-photon component of the light that is scattered at these Z0 quantum emitters and a two-photon component of the light that is not scattered is at a maximum.

2. The device according to claim 1, wherein the light source is a laser source.

3. The device according to claim 2, wherein the light source comprises at least one laser diode.

4. The device according to claim 1, wherein the quantum emitters comprise atoms and/or ions and/or molecules and/or quantum dots and/or defects in crystal structures.

5. The device according to claim 1, wherein at least one optical element is provided for defining the propagation path.

6. The device according to claim 1,
wherein an optical waveguide comprising a waveguide core is provided for guiding the light,
wherein the Z quantum emitters are arranged in a near field, and
wherein the near field comprises the electromagnetic field of the light in the waveguide core and outside the waveguide core.

7. The device according to claim 6, wherein the waveguide is designed as an optical fiber.

8. The device according to claim 6, wherein the waveguide core is arranged on a substrate.

9. The device according to claim 8, wherein the waveguide core is at least in sections sunk into the substrate.

10. The device according to claim 1, wherein a photonic crystal fiber having a hollow core is provided for guiding the light.

11. The device according to claim 10, wherein the quantum emitters are arranged in the hollow core.

12. The device according to claim 1,
wherein a crystal is arranged in the propagation path, and
wherein the Z quantum emitters are formed by crystal defects in the crystal.

13. The device according to claim 12,
wherein the Z quantum emitters are formed by dopant atoms,
wherein a material of the crystal comprises silicon, and
wherein the dopant atoms comprise boron atoms or phosphorus atoms.

14. The device according to claim 12, wherein the Z quantum emitters are formed by impurity atoms and/or vacancies.

15. The device according to claim 14, wherein the Z quantum emitters are formed by dopant atoms.

16. The device according to claim 1, wherein the quantum emitters are in gas form in the region of the propagation path.

17. The device according to claim 16,
wherein the quantum emitters have a further transition with the energy E' from the energy level N1 to a lower energy level N0,
wherein at least one further light source is provided for emitting further light, and
wherein the further light has the energy E', in order to resonantly excite the energy level N1 at quantum emitters and then to excite the energy level N* with the light of energy E at Z of these quantum emitters.

18. The device according to claim 17, wherein the at least one further light source is provided for emitting further light provides light of a further light mode.

19. The device according to claim 16, wherein the quantum emitters comprise lithium atoms and/or sodium atoms and/or potassium atoms and/or rubidium atoms and/or cesium atoms.

20. The device according to claim 1, wherein the device comprises the at least one light source for emitting light of one light mode.

* * * * *